(12) United States Patent
Uchiyama et al.

(10) Patent No.: US 9,255,861 B2
(45) Date of Patent: Feb. 9, 2016

(54) METHOD OF MEASURING OPTICAL LOSS AND APPARATUS FOR MEASURING OPTICAL LOSS

(75) Inventors: Haruyoshi Uchiyama, Musashino (JP); Yousuke Harima, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 506 days.

(21) Appl. No.: 12/947,351

(22) Filed: Nov. 16, 2010

(65) Prior Publication Data

US 2011/0116080 A1 May 19, 2011

(30) Foreign Application Priority Data

Nov. 18, 2009 (JP) ................................. 2009-262947

(51) Int. Cl.
*G01N 21/00* (2006.01)
*G01M 11/00* (2006.01)

(52) U.S. Cl.
CPC .......... *G01M 11/335* (2013.01); *G01M 11/337* (2013.01)

(58) Field of Classification Search
CPC ......................... G01M 11/335; G01M 11/337
USPC ........................................ 356/73.1; 250/205
See application file for complete search history.

(56) References Cited

U.S. PATENT DOCUMENTS

| 4,900,933 | A | * | 2/1990 | Nestor et al. | 250/458.1 |
| 5,015,067 | A | * | 5/1991 | Levatter | 385/123 |
| 5,021,647 | A | * | 6/1991 | Tatsuno et al. | 250/227.21 |
| 5,057,279 | A | * | 10/1991 | Inman et al. | 422/82.07 |
| 6,154,273 | A | * | 11/2000 | Suzuki | 356/73.1 |
| 6,594,003 | B1 | * | 7/2003 | Horiuchi et al. | 356/73.1 |
| 2003/0137652 | A1 | * | 7/2003 | Mori | 356/73.1 |
| 2009/0128451 | A1 | * | 5/2009 | Tokui | 345/55 |

FOREIGN PATENT DOCUMENTS

| JP | 63231246 A | * | 9/1988 | ............. G01N 21/59 |
| JP | 05-264336 A | | 10/1993 | |

* cited by examiner

*Primary Examiner* — Kara E Geisel
*Assistant Examiner* — Dominic J Bologna
(74) *Attorney, Agent, or Firm* — Sughrue Mion, PLLC (57) ABSTRACT

The invention is to provide an optical loss measuring method and an optical loss measuring apparatus capable of efficiently measuring an optical loss occurring to a target for measurement. The other optical loss measurement method comprising the steps of inputting light outputted from a light source to a target for measurement to thereby measure an output level of the target for measurement with the use of an optical power meter, maintaining the output level of the light source at a predetermined fixed value, and finding the optical loss occurring to the target for measurement on the basis of the output level of the light source maintained at the fixed value for use as the reference value.

7 Claims, 7 Drawing Sheets

METHOD OF MEASURING OPTICAL LOSS AND APPARATUS FOR MEASURING OPTICAL LOSS

FIELD OF THE INVENTION

The present invention relates to a method of measuring an optical loss (hereinafter referred to as optical loss measuring method) and an apparatus for measuring an optical loss (hereinafter referred to as optical loss measuring apparatus), more specifically, relates to efficiency of measuring an optical loss occurring to a target for measurement such as an optical fiber and an optical component.

For example, in an optical fiber laying construction, a light source having a known optical output power is connected to one end of the laid optical fiber and an optical power meter is connected to the other end thereof so as to confirm whether or not the optical fiber is accurately laid, thereby determining whether or not a measured value of the optical power meter is in a given level within which the measured value tolerate an optical loss.

At the time of measuring an optical loss, pluralities of wavelengths have been also measured by switching over output wavelengths of a light source.

Figure 6:
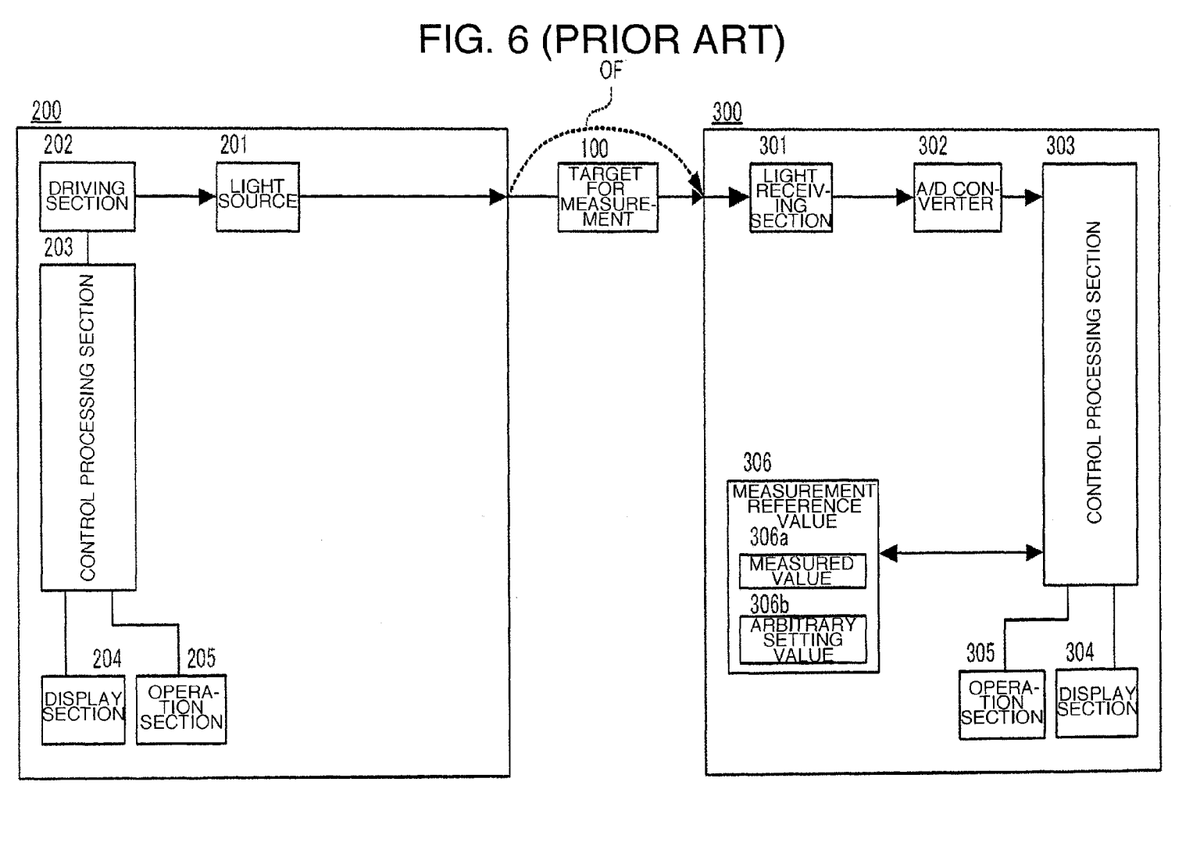
FIG. 6 is a block diagram showing an embodiment of a conventional optical loss measuring system.

FIG. 6 is a block diagram showing an embodiment of a conventional optical loss measuring system. In FIG. 6, a light source device 200 is connected to one of a target for measurement 100 such as an optical fiber, and an optical power meter 300 is connected to the other end of the target for measurement 100.

In the light source device 200, a light source 201 is driven by a driving section 202 to emit light serving as measurement light, thereby irradiating at one end of the target for measurement 100. The driving section 202 is controlled by a control processing section 203. A display section 204 for displaying an output level of the measurement light and an operation section 205 for setting the output level of the measurement light are connected to the control processing section 203, respectively. Meanwhile, an output level at the output terminal of the light source 201 is accurately not clear.

The optical power meter 300 receives light that falls thereon via the target for measurement 100 and measures a level of the light.

In the optical power meter 300, a light receiving section light 301 converts an optical signal into an electrical signal and sends the electrical signal to an A/D converter 302. The A/D converter 302 converts the electrical signal corresponding to the optical signal into a digital signal and sends the digital signal to a control processing section 303.

A display section 304 for displaying a measured value of the measurement light and an operation section 305 for setting the measurement condition of the measurement light, a memory 306 for storing the measured value of the measurement light are connected to the control processing section 303, respectively.

With the configuration of the optical measuring system as set forth above, there is described a case of measuring an optical loss occurring to the target for measurement 100.

First of all, as shown by a broken line, an output terminal of the light source device 200 and the optical power meter 300 are directly connected to each other by an optical fiber OF serving as a standard such as a master code that is short in length and small in optical loss, thereby measuring a level of light emitted from the optical fiber OF in this state, causing the measured value to be a reference value to be stored in the memory 306. For the reference value, it is possible to set an arbitrary measured value measured by a device provided externally, and so forth in addition to a measured value of the optical power meter 300 per set.

Subsequently, the output terminal of the light source device 200 and the optical power meter 300 are connected to each other by the target for measurement 100 instead of the arbitrary optical fiber OF, thereby measuring the level of light emitted from the target for measurement 100.

It is possible to measure an optical loss occurring to the target for measurement 100 by calculating a difference between a measured value of the level of light in a state where the target for measurement 100 is connected between the light source device 200 and the optical power meter 300 and the reference value previously stored in the memory 306.

Figure 7:
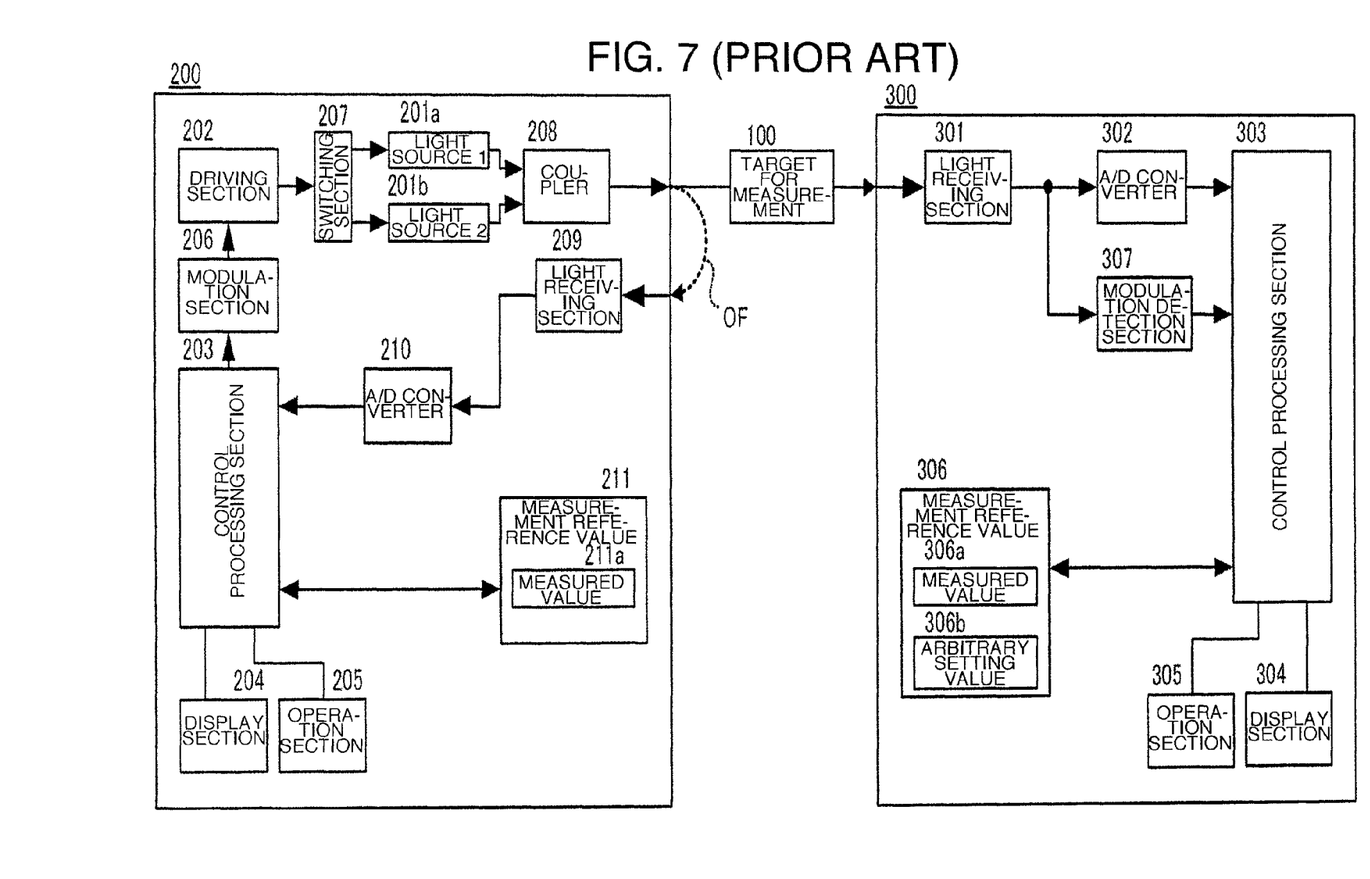
FIG. 7 is a block diagram showing another embodiment of a conventional optical loss measuring system.

FIG. 7 is a block diagram showing another embodiment of a conventional optical loss measuring system, and elements common to those of FIG. 6 are denoted by the same reference numerals. With the configuration of FIG. 7, a light source device 200 and an optical power meter 300 are provided with a communication function, respectively.

In the light source device 200, a modulation section 206 is connected between a driving section 202 and a control processing section 203 for modulating measurement information into an optical signal to thereby execute communication. Light sources 201a and 201b of two systems are connected to the driving section 202 via a switching section 207, and light outputted from the light sources 201a and 201b of two systems irradiates at one end of the target for measurement 100 via a coupler 208.

There is also provided a light receiving section 209 in the light source device 200, and a light outputted from the coupler 208 falls on the light receiving section 209 via an optical fiber OF as shown by a broken line. The light receiving section 209 converts an optical signal into an electric signal and sends the electric signal to an A/D converter 210. The A/D converter 210 converts the electrical signal corresponding to the optical signal into a digital signal and sends the digital signal to the control processing section 203. There is also provided a memory 211 connected to the control processing section 203 for storing therein a measured value of the light outputted from the coupler 208 that falls on the light receiving section 209 for use as a reference value.

There is provided a modulation detection section 307 for detecting measurement information that is modulated from an output signal of the light receiving section 301 as an optical signal, and the detected measurement information is outputted to the control processing section 303.

With the configuration of FIG. 7, there is described a case of measuring the optical loss occurring to the target for measurement 100.

First of all, the light source device 200 sends the measured value of the light outputted from the coupler 208 that is measured in advance by the light receiving section 209 and stored in the memory 211 for use as the reference value, to the optical power meter 300 via the modulation section 206 through optical communication.

The optical power meter 300 stores the measured value of the light outputted from the coupler 208 received through optical communication in the memory 306 for use as the reference value.

The optical loss occurring to the target for measurement 100 is measured by calculating a difference between the measured value acquired by measuring level of light emitted from the target for measurement 100 by the light receiving section 301 and the reference value previously stored in the memory 306.

JP 5-264336A describes an optical loss measuring apparatus having small measurement error caused by output fluctuation of the light source.

With the configuration of FIG. 6, a reference value for measurement needs to be given to the optical power meter 300 by any of previous measurement, information transmission means such as oral, telephone, etc.

Further, in a state where the light source device 200 is remote from the optical power meter 300, it is troublesome to execute information transmission of reference value for measurement, for example, in case of setting by manual inputting of numerals, there is a high possibility of mistake.

With the configuration of FIG. 7, since the reference value data is transmitted from the light source device 200 to the optical power meter 300 through optical communication, it is possible to avoid input mistake such as setting by manual inputting of numerals, but it takes relatively much time to execute transfer processing of the reference value data. Particularly, in case of transmission of values for plurality wavelengths, it takes a lot of trouble by plural times more than the transmission of plurality wavelengths.

SUMMARY OF THE INVENTION

The present invention has been developed to solve those problems described as above, and it is therefore an object of the invention to provide an optical loss measuring method and an optical loss measuring apparatus capable of efficiently measuring an optical loss occurring to the target for measurement.

To achieve the above object, an optical loss measurement method according to a first aspect of the invention comprises the steps of inputting light outputted from a light source to a target for measurement to thereby measure an output level of the target for measurement with the use of an optical power meter, acquiring a measured value of an output level of the light source, serving as a reference value, and finding an optical loss occurring to the target for measurement on the basis of a difference between the reference value and a measured value of the output level of the target for measurement, acquired with the use of the optical power meter, wherein the output level of the light source is maintained at a predetermined fixed value, and the optical loss occurring to the target for measurement is found on the basis of the output level of the light source maintained at the fixed value for use as the reference value.

According to the foregoing optical loss measurement method, light sources of a plurality of systems, differing in wavelength from each other, are in use for the light source.

An optical loss measurement apparatus according to the second aspect of the invention for measuring an optical loss by inputting light outputted from a light source to a target for measurement to thereby measure an output level of the target for measurement with the use of an optical power meter, and acquiring a measured value of an output level of the light source, serving as a reference value, to find an optical loss occurring to the target for measurement on the basis of a difference between the reference value and a measured value of the output level of the target for measurement, acquired with the use of the optical power meter, the apparatus comprises a light receiving section for receiving the light outputted from the light source, and a driving section for driving the system such that the measured value of the output level of the light source is maintained at a predetermined fixed value on the basis of an output signal of the light receiving section.

According to the foregoing optical loss measurement apparatus, the light source is made up of respective light sources of a plurality of systems, differing in wavelength from each other.

According to the foregoing optical loss measurement apparatus, it further comprises a modulation section for modulating wavelength information into an optical signal to thereby execute communication, and a modulation detection section for detecting wavelength information that is modulated as an optical signal from the output signal of the light receiving section.

According to the present invention, it is possible to efficiently measure an optical loss occurring to the target for measurement.

PREFERRED EMBODIMENT OF THE INVENTION

The present invention is now described in detail with reference to the attached drawings.

Figure 1:
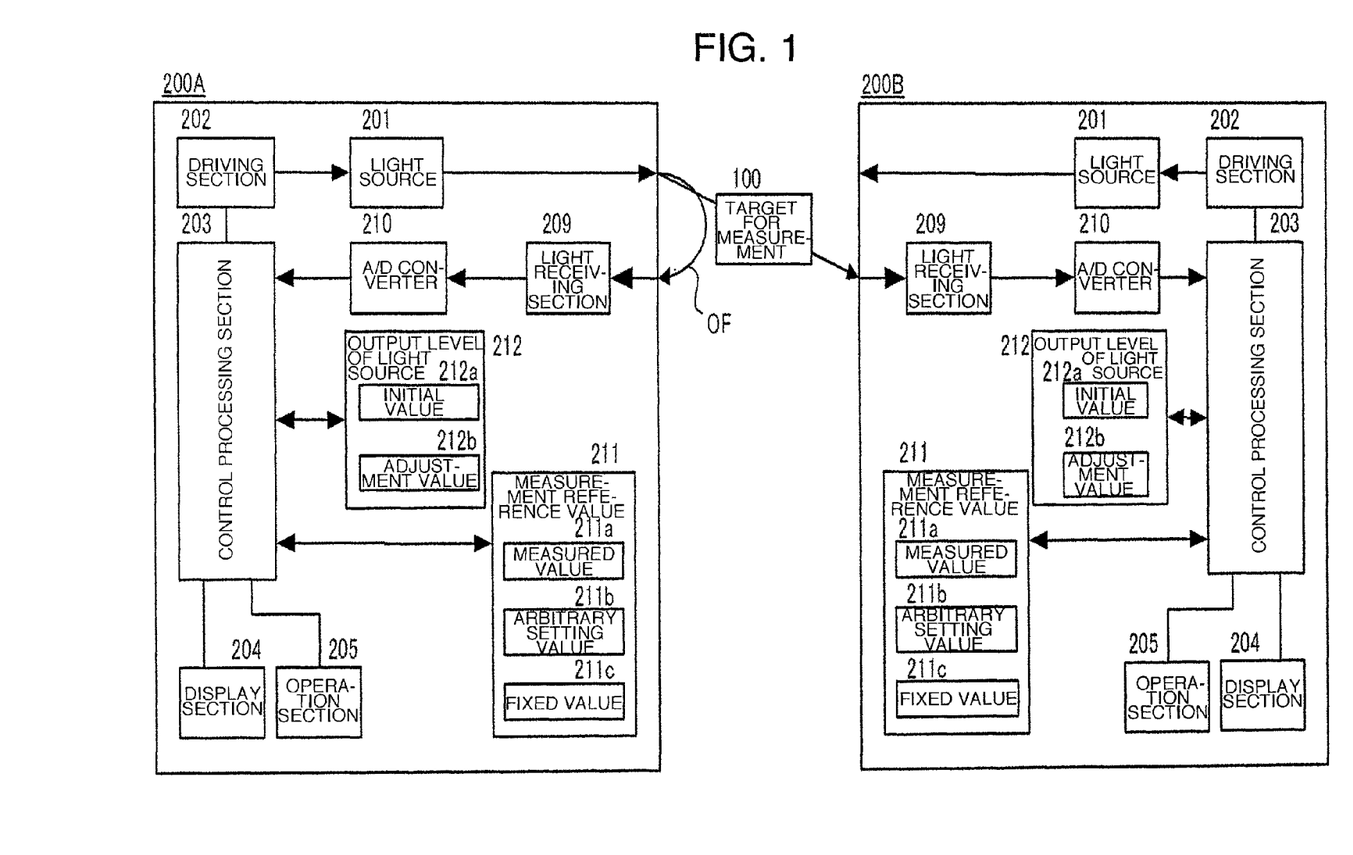
FIG. 1 is a block diagram showing an embodiment of an optical loss measuring system employing an optical loss measuring apparatus of the present invention.

FIG. 1 is a block diagram showing an embodiment of an optical loss measuring system employing an optical loss measuring apparatus of the present invention. Elements common to those of FIGS. 6 are 7 are denoted by the same reference numerals. In FIG. 1, an optical loss measuring apparatus 200A for use as a light source device and an optical loss measuring apparatus 200B for use as an optical power meter are configured in the same way and provided with two memories 211 and 212, respectively. For the memories 211 and 212, a common one-memory area is generally assigned to respective uses but it is assumed that in the present embodiment memories are provided according to each use for the sake of explanation.

As a reference value at the time of execution of measurement of an optical loss, a measured value 211a measured by the light receiving section 209, an arbitrary setting value 211b and a fixed value 211c are stored in the first memory 211, respectively.

An initial value 212a and an adjustment value 212b are stored in the second memory 212 as control data for controlling the output level of the light source 201.

Measurement of an optical loss occurring to the target for measurement 100 is described hereafter. At the time of measuring the optical loss occurring to the target for measurement 100 such as an optical fiber and an optical component, the light outputted from the light source 201 of one optical loss measuring apparatus 200A for use as a light source device irradiates at one end of the target for measurement 100, and falls on the light receiving section 209 via the optical fiber OF.

Meanwhile a light source 201 of the other optical loss measuring apparatus 200B for use as the optical power meter is turned off so that the output terminal thereof is opened and the light outputted from the other end of the target for measurement 100 falls on a light receiving section 209.

In the optical loss measuring apparatus 200A for use as the light source device, the light source 201 is driven in response to a driving signal from a driving section 202 that is controlled by a control signal from a control processing section 203, thereby emitting light. When the light source 201 is driven to emit light, the level of emission and output level of the light source 201 is controlled and set by the initial value 211a and the adjustment value 211b stored in the memory 212, respectively.

The light receiving section 209 converts the light outputted from the light source 201, that falls thereon via the optical fiber OF, into an electric signal, and sends it to an A/D converter 210. The A/D converter 210 converts the inputted electric signal into a digital signal and sends it to a control processing section 203. As a result, the control processing section 203 knows the level of the light outputted from the light source 201.

Since the light source 201 and the light receiving section 209 are connected to each other by the optical fiber OF, the light source 201 emits light and the light receiving section 209 receives the light outputted from the light source 201 and measures the level of the light outputted from the light source 201, so that the light receiving section 209 adjusts the driving signal for the light source 201 for causing the measured value to become a desired value, thereby setting and maintaining the level of light outputted from the light source 201 to a fixed value.

For example, provided that the output level of the light source 201 is 0 dBm, information (value) of a driving signal for the light source at this time can be stored in the memory 212 as the adjustment value 212b that adjusted the output the output level.

At the time of measuring the optical loss occurring to the target for measurement 100, the light source 201 is driven to thereby emit light on the basis of the adjustment value 212b stored in the memory 212, thereby emitting the output light having a fixed level.

In the optical loss measuring apparatus 200B for use as the optical power meter, the light receiving section 209 receives an optical signal outputted from the target for measurement 100 and converts it into an electric signal. The A/D converter 210 and the control processing section 203 measures the level of the optical signal outputted from the target for measurement 100 on the basis of the electric signal that was converted by the light receiving section 209.

At the time of execution of measurement of the level of the optical signal, although there are an absolute measurement for measuring an absolute value of the received optical signal and a relative measurement for measuring a difference between a reference value and a measured value, the optical loss measuring apparatus of the invention is provided with an optical loss measurement function as one type of the relative measurement.

That is, for use as the reference value of the optical loss measurement function, a value measured by the optical loss measuring apparatus per se is stored in the memory 211 as the measured value 211a, the reference value can be stored and set in the memory 211 as the arbitrary setting value 211b, and also the level of the optical signal outputted on the basis of the output level adjustment function of the light source 201 can be stored and set in the memory 211 as the fixed value 211c.

For example, if this is referred to as a fixed value mode, the level of a light outputted from the target for measurement 100 as received at this time is calculated as a relative value on the basis of the fixed value 211c.

As a result, when the optical loss measuring apparatus 200A and the optical loss measuring apparatus 200B operate in the fixed value mode, the optical loss measurement can be executed without transmitting the reference value from the optical loss measuring apparatus 200A to the optical loss measuring apparatus 200B that operates as the optical power meter side, thereby efficiently measuring the optical loss occurring to the target for measurement 100.

Figure 2:
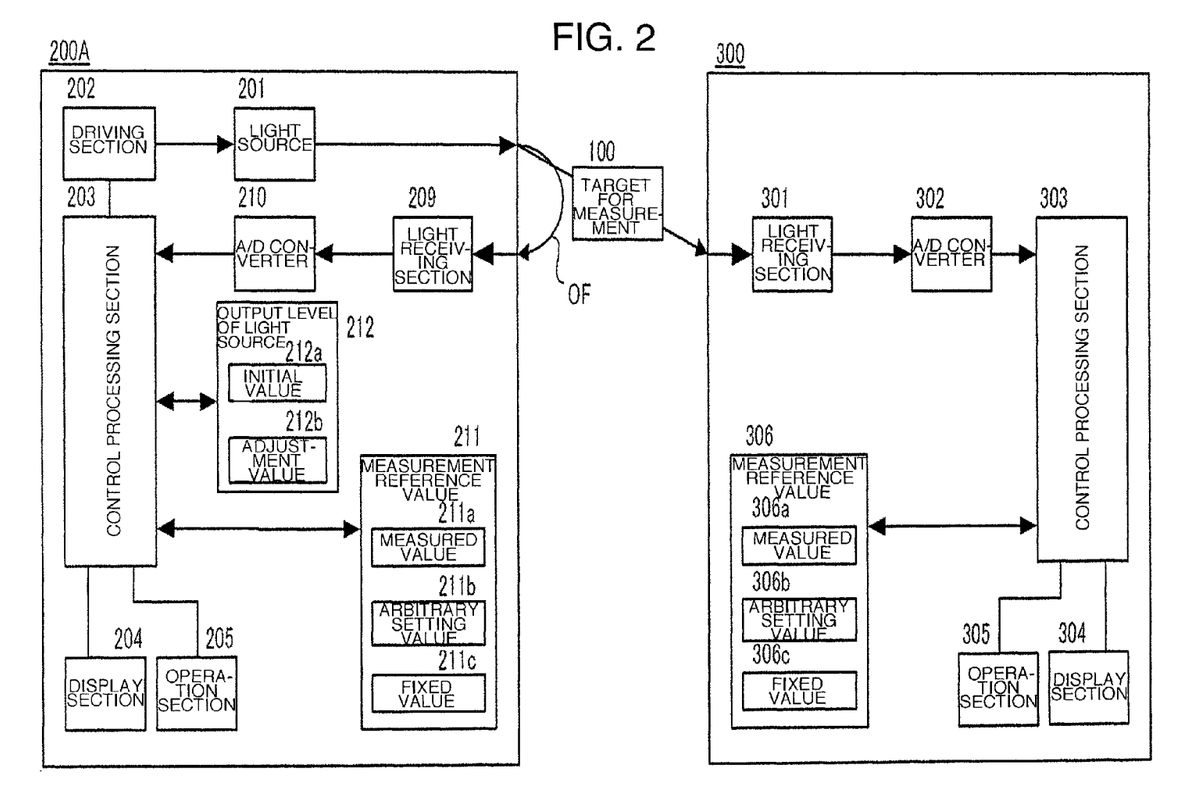
FIG. 2 is a block diagram showing another embodiment of an optical loss measuring system employing the optical loss measuring apparatus of the present invention.

Although the embodiment shown in FIG. 1 represents the example wherein the optical loss measuring apparatus 200A for use as the light source device and the optical loss measuring apparatus 200B for use as the optical power meter are configured in the same way, in the case where the optical loss measuring apparatus 200B is exclusively used for the optical power meter, the light source system may be dispensed with as shown in FIG. 2. Meanwhile, in FIG. 2, the optical loss measuring apparatus 200B is represented as an optical power meter 300.

Figure 3:
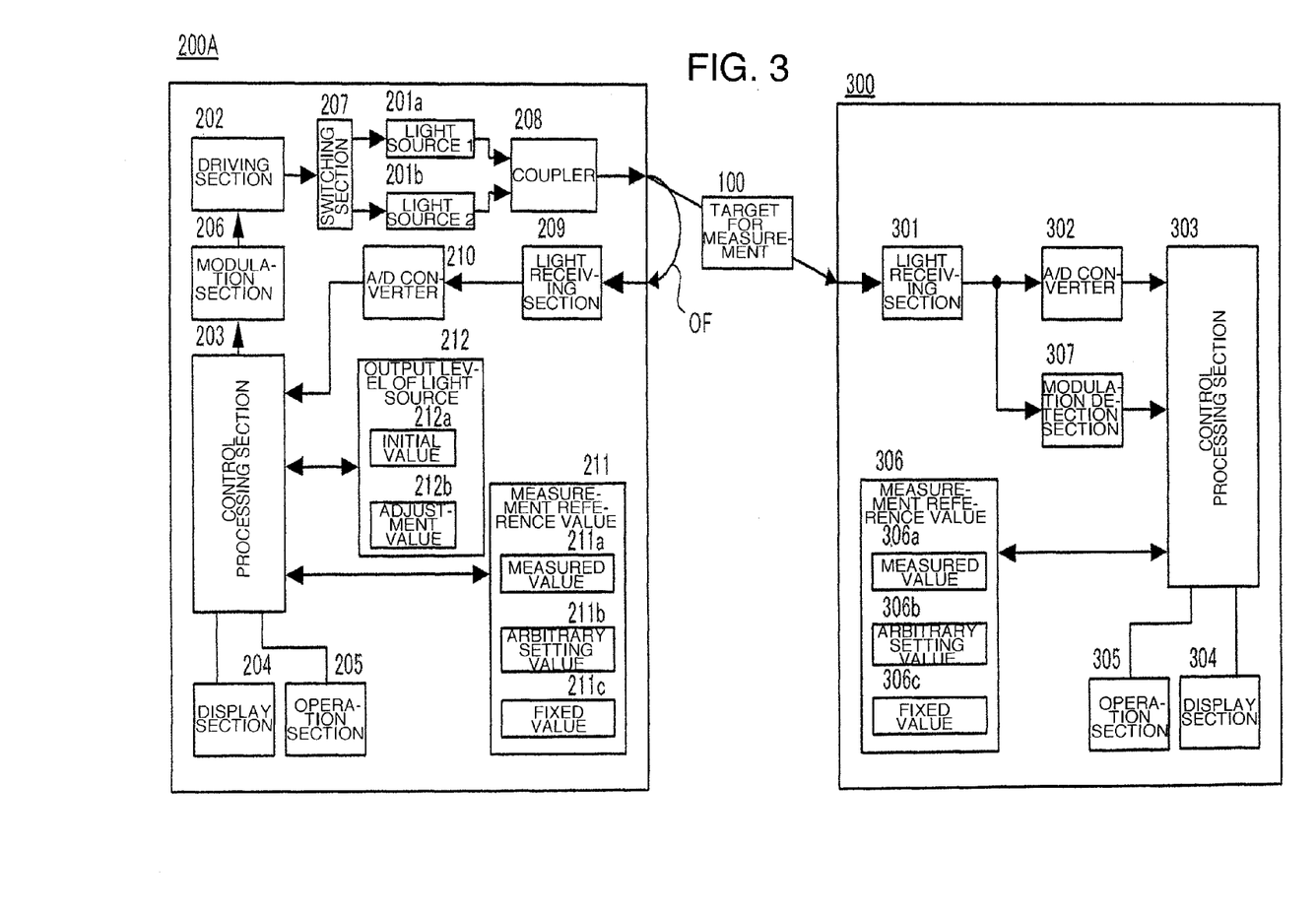
FIG. 3 is a block diagram showing still another embodiment of an optical loss measuring system employing the optical loss measuring apparatus of the present invention.

FIG. 3 shows an example wherein the optical loss measuring apparatus 200A shown in the embodiment of FIG. 2 is provided with light sources 201a and 201b of two systems. In FIG. 3, although the light sources 201a and 201b are differing in wavelength from each other, they can execute level adjustment of their output light, and they have an adjustment value 212b, and can emit the output light having a desired set level.

Even if the light sources 201a and 201b are differing in wavelength from each other, they can grasp the wavelengths thereof that are emitted by them, so that they can automatically switch over the wavelength sensitivity of the light receiving section 209.

Further, in case of execution of an optical loss measurement in the fixed value mode with the use of the light source device having the configuration provided with the plurality of light sources 201a and 201b, wavelength information is transmitted from the optical loss measuring apparatus 200A to an optical power meter 300 through optical communication via a modulation section 206 while the wavelength information can be detected from the output signal of a light receiving section 301 by a modulation detection section 307 at an optical power meter 300 side so that setting wavelength of the light receiving section 301 at the optical power meter 300 side is caused to be matched with the output wavelength of the light source, thereby automatically switching over the wavelength and executing the optical loss measurement in appropriate prescribed conditions every wavelength.

Figure 4:
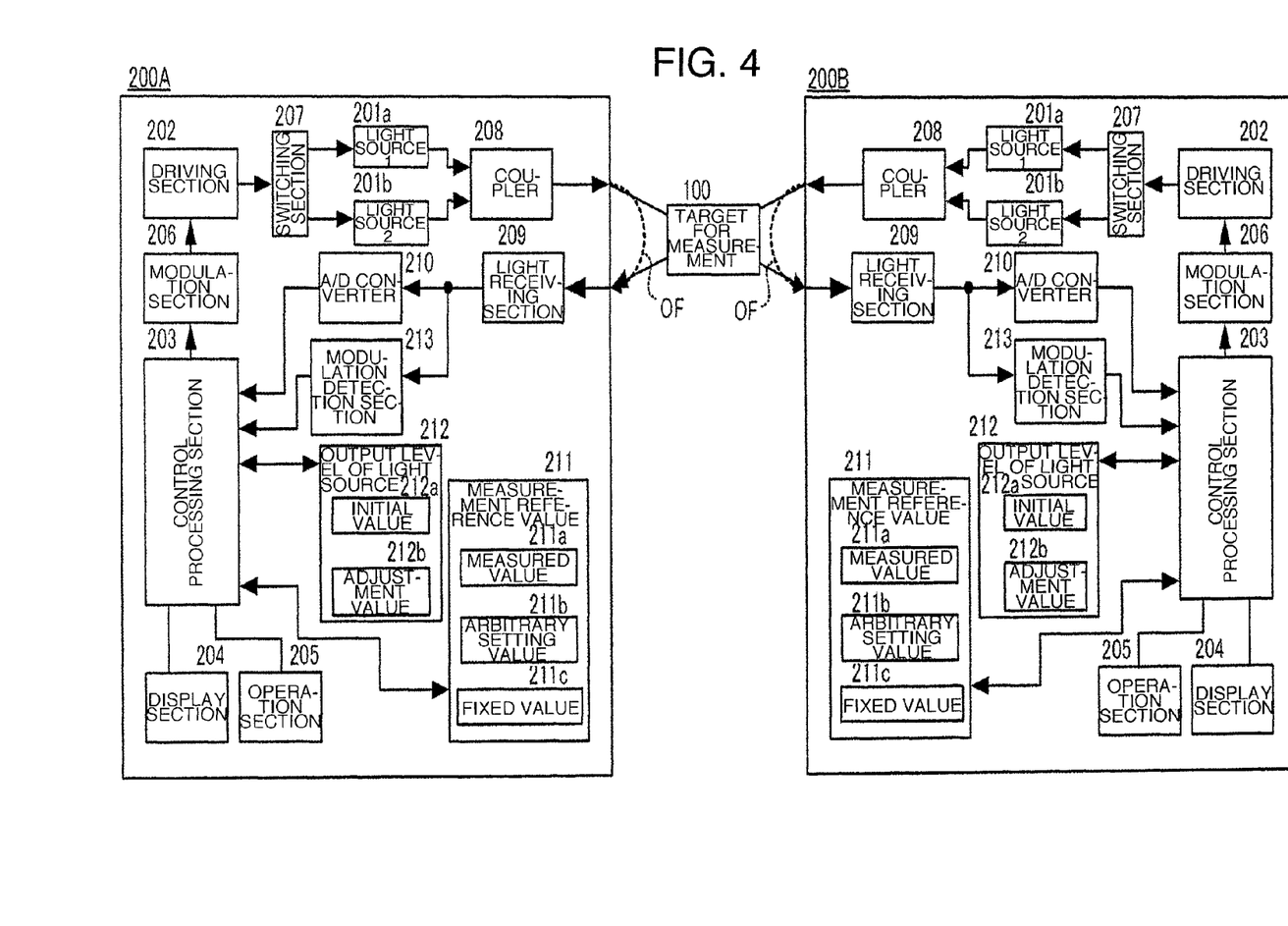
FIG. 4 is a block diagram showing yet another embodiment of an optical loss measuring system employing the optical loss measuring apparatus of the present invention.

FIG. 4 is a block diagram showing yet another embodiment of an optical loss measuring system. This embodiment shows an example of an optical loss measuring apparatus 200B for use as an optical power meter and having the same configuration as the optical loss measuring apparatus 200A for use as the light source device in FIG. 3. Meanwhile, both the optical loss measuring apparatus 200A and the optical loss measuring apparatus 200B used in FIG. 4 are provided with modulation detection section 213 for detecting wavelength information from an output signal of a light receiving section 209.

Further, with the configuration of FIG. 4, a function of the optical loss measuring apparatus 200A for use as the light source device and that of the optical loss measuring apparatus 200B for use as the power meter are switched over when needed, so that the optical loss measuring apparatus 200B is used for the light source device and the optical loss measuring apparatus 200A is used for the optical power meter, thereby measuring optical loss occurring to the target for measurement 100 from the reverse direction. This allows a direction of the optical loss characteristics of the target for measurement 100 to be confirmed.

Figure 5:
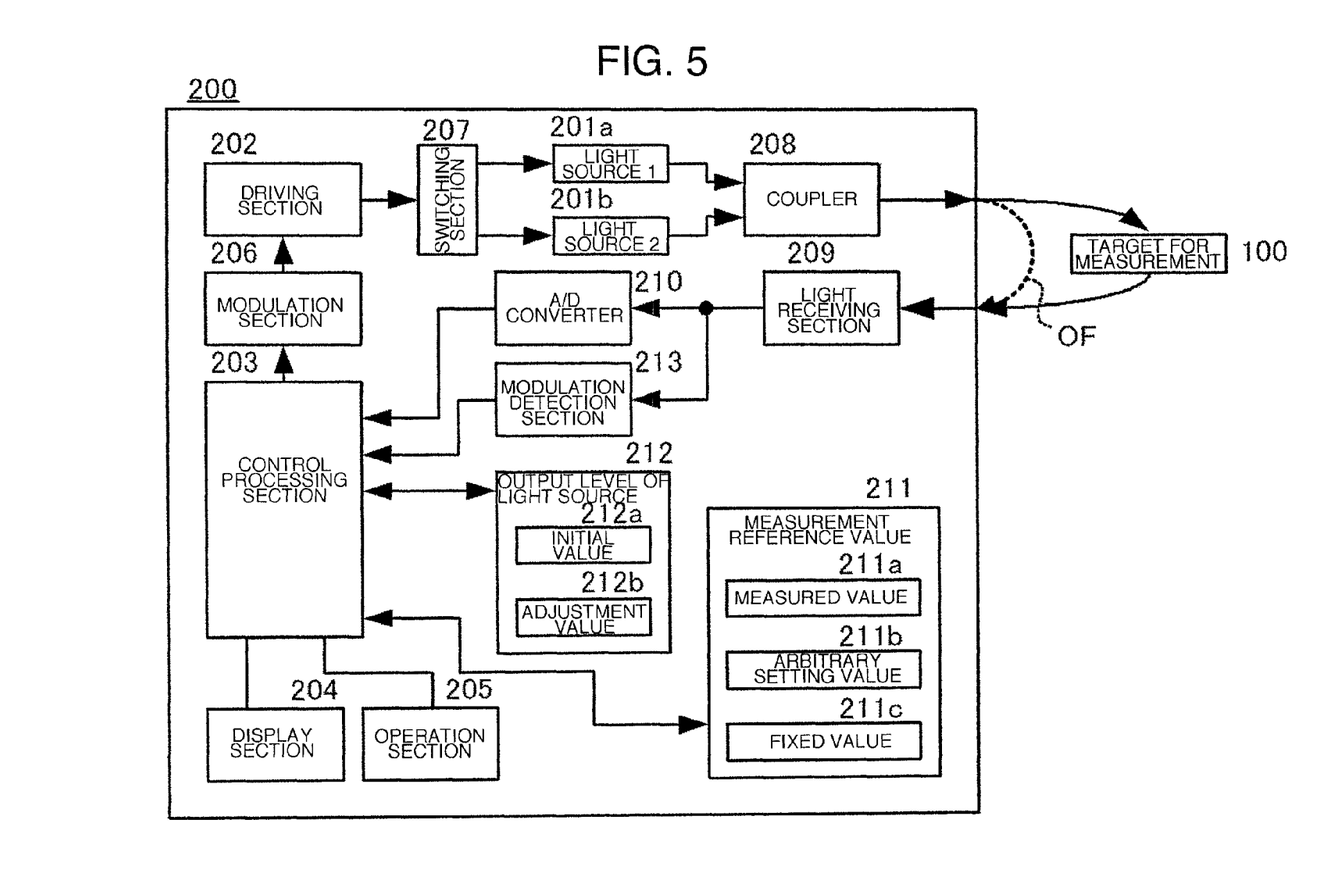
FIG. 5 is block diagrams showing yet still another embodiment of an optical loss measuring system employing the optical loss measuring apparatus of the present invention.

FIG. 5 is an embodiment of an optical loss measuring system for measuring an optical loss occurring to a target for measurement 100 with the use of only one optical loss measuring apparatus 200 provided with a plurality of light sources 201a, 201b differing in wavelength from each other, that have been used in the embodiments of FIGS. 3 and 4.

With the configuration of FIG. 5, an initial value 212a and an adjustment value 212b of the light sources 201a, 201b differing in wavelength from each other are stored in the optical loss measuring apparatus 200, and a measured value 211a, an arbitrary setting value 211b and a fixed value 211c are also stored for use as the reference value of the optical loss measurement function for respective wavelengths. As a result, wavelength characteristics of the light receiving sections 209 is caused to be matched with wavelength of the optical source 201 by the common control processing section 203 in response to the wavelength information that is driven and outputted from the light source 201, thereby quickly measuring the optical loss occurring to the target for measurement 100.

Although examples employing the light sources of two systems, differing in wavelength from each other, are shown in the above embodiments, it may be possible to use light sources of more than three system, differing in wavelength from each other, or light sources that are variable in wavelengths and arbitrarily adjustable in output wavelengths.

As mentioned in detail above, according to the present invention, it is possible to implement the optical loss measuring method and the optical loss measuring apparatus capable of efficiently measuring an optical loss occurring to the target for measurement.

The present invention is not limited to the foregoing embodiments, and hence it may include many changes and variations unless deviating from the essence of the present invention.

What is claimed is:

1. A method of measuring an optical loss, comprising:
    storing a predetermined fixed power level value in an optical loss measuring apparatus and in an optical power meter;
    inputting light outputted from a light source in the optical loss measuring apparatus to a first end portion of a target for measurement;
    setting an output level of the light source in the optical loss measuring apparatus to the predetermined fixed power level value;
    setting the predetermined fixed power level value in the optical power meter as a reference power value;
    measuring a measured power value of an output level of a second end portion of the target for measurement with the optical power meter; and
    determining an optical loss occurring to the target for measurement on the basis of a difference between the reference power value and the measured power value of the output level of the second end portion of the target for measurement in the optical power meter,
    wherein the output level of the light source is maintained at the predetermined fixed power level value, and the optical loss occurring to the target for measurement is found on the basis of the output level of the light source maintained at the predetermined fixed power level value used as the reference power value in the optical power meter,
    wherein the light is transmitted from the first end portion of the target for measurement to the second end portion of the target for measurement along a direction of the target for measurement, and
    wherein the light source and a light receiving section in the optical loss measuring apparatus are connected to each other by the target for measurement, the light source emitting the light, and the light receiving section receiving the light outputted from the light source and measuring the output level, so a driving signal for the light source is adjusted to set the output level of the light source to the predetermined fixed power level value.

2. The method of measuring an optical loss according to claim 1, wherein the light source comprises light sources of a plurality of systems, differing in wavelength from each other.

3. An apparatus for measuring an optical loss comprising:
    a memory in which a predetermined fixed power level value is stored;
    a light receiving section which is configured to receive light from a first end portion of a target for measurement outputted from a light source of a light transmitting section to a second end portion of the target for measurement; and
    a driving section configured to set an output level of the light source to the predetermined fixed power level value and to drive the light source such that a measured power value of the output level of the light source is maintained at the predetermined fixed power level value on the basis of an output signal of the light receiving section of an optical power meter,
    wherein the predetermined fixed power level value is used as a reference power value to determine the optical loss occurring to the second end portion of the target for measurement on the basis of a difference between the reference power value and a measured power value of an output level of light outputted from the second end portion of the target for measurement,
    wherein the light is transmitted from the first end portion of the target for measurement to the second end portion of the target for measurement along a direction of the target for measurement, and
    wherein the light source and the light receiving section are connected to each other by the target for measurement, the light source emitting the light, and the light receiving section receiving the light outputted from the light source and measuring the output level, so a driving signal for the light source is adjusted to set the output level of the light source to the predetermined fixed power level value.

4. The apparatus for measuring an optical loss according to claim 3, wherein the light source comprises light sources of a plurality of systems, differing in wavelength from each other.

5. The apparatus for measuring an optical loss according to claim 3, further comprising:
    a modulation section for modulating wavelength information into an optical signal to thereby execute communication; and
    a modulation detection section for detecting wavelength information that is modulated as an optical signal from the output signal of the light receiving section.

6. The apparatus for measuring an optical loss according to claim 4, further comprising:
    a modulation section for modulating wavelength information into an optical signal to thereby execute communication; and a modulation detection section for detecting wavelength information that is modulated as an optical signal from the output signal of the light receiving section.

7. A system for measuring an optical loss comprising:

an optical loss measuring apparatus comprising a first memory, a light source, a first light receiving section, and a driving section;

an optical power meter comprising a second memory, and a second light receiving section, wherein the first memory and the second memory store a predetermined fixed power level value;

wherein the first light receiving section is configured to receive light from a first end portion of a target for measurement outputted from the light source to a second end portion of the target for measurement, wherein the driving section is configured to set an output level of the light source to the predetermined fixed power level value and to drive the light source such that a measured power value of the output level of the light source is maintained at the predetermined fixed power level value stored in the first memory on the basis of an output signal of the first light receiving section of an optical power meter, wherein the predetermined fixed power level value stored in the second memory is used as a reference power value to determine the optical loss occurring to the second end portion of the target for measurement on the basis of a difference between the reference power value and a measured power value of an output level of light outputted from the second end portion of the target for measurement, wherein the light is transmitted from the first end portion of the target for measurement to the second end portion of the target for measurement along a direction of the target for measurement, and wherein the light source and the light receiving section are connected to each other by the target for measurement, the light source emitting the light, and the light receiving section receiving the light outputted from the light source and measuring the output level, so a driving signal for the light source is adjusted to set the output level of the light source to the predetermined fixed power level value.

* * * * *